United States Patent
Verma et al.

(10) Patent No.: US 10,178,174 B2
(45) Date of Patent: Jan. 8, 2019

(54) MIGRATING DATA IN RESPONSE TO CHANGES IN HARDWARE OR WORKLOADS AT A DATA STORE

(71) Applicant: Microsoft Technology Licensing, LLC, Redmond, WA (US)

(72) Inventors: Surendra Verma, Bellevue, WA (US); Emanuel Paleologu, Kirkland, WA (US); Erik Gregory Hortsch, Bellevue, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 15/645,515

(22) Filed: Jul. 10, 2017

(65) Prior Publication Data

US 2017/0310757 A1 Oct. 26, 2017

Related U.S. Application Data

(63) Continuation of application No. 14/486,198, filed on Sep. 15, 2014.

(51) Int. Cl.
  *G06F 15/16* (2006.01)
  *H04L 29/08* (2006.01)
  *G06F 3/06* (2006.01)

(52) U.S. Cl.
  CPC .......... *H04L 67/1097* (2013.01); *G06F 3/061* (2013.01); *G06F 3/067* (2013.01);
  (Continued)

(58) Field of Classification Search
  CPC .. G06F 3/0647; G06F 11/203; G06F 11/2058; G06F 11/2082; G06F 17/303
  See application file for complete search history.

(56) References Cited

U.S. PATENT DOCUMENTS

| 5,392,244 A | 2/1995 | Jacobson et al. |
| 5,542,065 A | 7/1996 | Burkes et al. |

(Continued)

FOREIGN PATENT DOCUMENTS

| EP | 1669849 A2 | 6/2006 |
| WO | 2011042940 A1 | 4/2011 |

OTHER PUBLICATIONS

"StorSimple Solution for File Share Deployments", Retrieved from <<https:/ cdn2.hubspot.net/hub/65157/file-306262454-pdf/docs/StorSimple-for-File-Share-Deployments-SEPT2013-2.pdf>>, Sep. 2013, 24 Pages.

(Continued)

*Primary Examiner* — Hitesh Patel
(74) *Attorney, Agent, or Firm* — Workman Nydegger

(57) ABSTRACT

Embodiments are directed to modifying storage capacity within a data store and to modifying resiliency for a data store. In one scenario, a computer system receives a request to move data. The computer system may determine that data is to be moved from an allocation on one data store to a new allocation on another data store. The computer system may create a new allocation on the other data store, where the new allocation is configured to receive data from the first data store. The computer system then moves the data to the new allocation on the second data store as data I/O requests are received at the first data store. Data store access requests are synchronized with the data movement by directing the data store access requests to the first data store, to the second data store or to both data stores depending on the type of access request.

21 Claims, 6 Drawing Sheets

(52) U.S. Cl.
CPC .......... *G06F 3/0607* (2013.01); *G06F 3/0608* (2013.01); *G06F 3/0647* (2013.01); *G06F 3/0659* (2013.01); *G06F 3/0689* (2013.01)

(56) References Cited

U.S. PATENT DOCUMENTS

| | | | |
|---|---|---|---|
| 5,875,456 | A | 2/1999 | Stallmo et al. |
| 6,108,748 | A | 8/2000 | Ofek et al. |
| 6,640,291 | B2 | 10/2003 | Fujibayashi et al. |
| 7,281,104 | B1 | 10/2007 | Tsypliaev et al. |
| 7,913,056 | B2 | 3/2011 | Brown et al. |
| 2003/0115439 | A1 | 6/2003 | Mahalingam et al. |
| 2005/0091078 | A1 | 4/2005 | Hunt et al. |
| 2006/0059306 | A1 | 3/2006 | Tseng |
| 2008/0109601 | A1* | 5/2008 | Klemm ............ G06F 3/0608 711/114 |
| 2008/0275928 | A1 | 11/2008 | Shuster |
| 2009/0172277 | A1 | 7/2009 | Chen |
| 2009/0222631 | A1 | 9/2009 | Sugiura |
| 2011/0191537 | A1* | 8/2011 | Kawaguchi ........ G06F 3/0605 711/114 |
| 2011/0246922 | A1 | 10/2011 | Koenig et al. |
| 2012/0278571 | A1* | 11/2012 | Fleming ............ G06F 9/455 711/162 |

OTHER PUBLICATIONS

"Final Office Action Issued in U.S. Appl. No. 14/486,198", dated Jan. 20, 2017, 24 Pages. (MS# 355680-US-NP).

"Non-Final Office Action Issued in U.S. Appl. No. 14/486,198", dated Jun. 16, 2016, 27 Pages. (MS# 355680-US-NP).

"Notice of Allowance Issued in U.S. Appl. No. 14/486,198", dated Apr. 14, 2017, 16 Pages. (MS# 355680-US-NP).

"International Preliminary Report on Patentability ssued in PCT Application No. PCT/US2015/049873", dated Dec. 1, 2016, 8 Pages. (MS# 355680-WO-PCT).

"International Search Report and Written Opinion Issued in PCT Application No. PCT/US2015/049873", dated Mar. 8, 2016, 17 Pages. (MS# 355680-WO-PCT).

"Second Written Opinion Issued in PCT Application No. PCT/US2015/049873", dated Jul. 27, 2016, 11 Pages. (MS# 355680-WO-PCT).

* cited by examiner

MIGRATING DATA IN RESPONSE TO CHANGES IN HARDWARE OR WORKLOADS AT A DATA STORE

CROSS-REFERENCE TO RELATED APPLICATIONS

This application is a continuation of U.S. patent application Ser. No. 14/486,198 filed on Sep. 15, 2014, entitled "Online Data Movement Without Compromising Data Integrity," which application is expressly incorporated herein by reference in its entirety.

BACKGROUND

Computing systems have become ubiquitous, ranging from small embedded devices to phones and tablets to PCs and backend servers. Each of these computing systems includes some type of data storage and typically, many different types of data storage. For example, a computing system may include solid-state storage and a hard drive or set of hard drives. The solid-state storage may be able to handle read and write I/O requests more quickly than the hard drive, but may not have the storage capacity of the hard drive. Other media such as tape drives, DVDs (or other optical media) or other kinds of media may have different advantages and disadvantages when reading, writing and storing data.

BRIEF SUMMARY

Embodiments described herein are directed to modifying storage capacity within a data store and to modifying resiliency for at least a portion of a data store. In one embodiment, a computer system receives a request to move data. The request to move data may specify a data store to move the data off of, a data store to move the data to, or may allow the computer system to select where the data is moved from and/or moved to. The computer system may determine that data is to be moved from an allocation on one data store to a new allocation on another data store. The computer system may create a new allocation on the other data store, where the new allocation is configured to receive data from the first data store. The computer system then moves the data to the new allocation on the second data store as data I/O requests are received at the first data store. Data store access requests are synchronized with the data movement by directing the data store access requests to the first data store, to the second data store or to both data stores depending on the type of access request.

In another embodiment, a computer system modifies resiliency for a data store. The computer system determines that a resiliency scheme for at least part of a data store is to be changed from one resiliency scheme to another resiliency scheme, where the data store is configured to store different portions of data. The computer system determines how the specified portion of data within the data store is to be altered according to the change in resiliency scheme, and modifies the resiliency scheme of the specified portion of the data store, such that the resiliency scheme for the specified portion of the data store is changed, while the resiliency scheme for other portions of the data store is not changed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
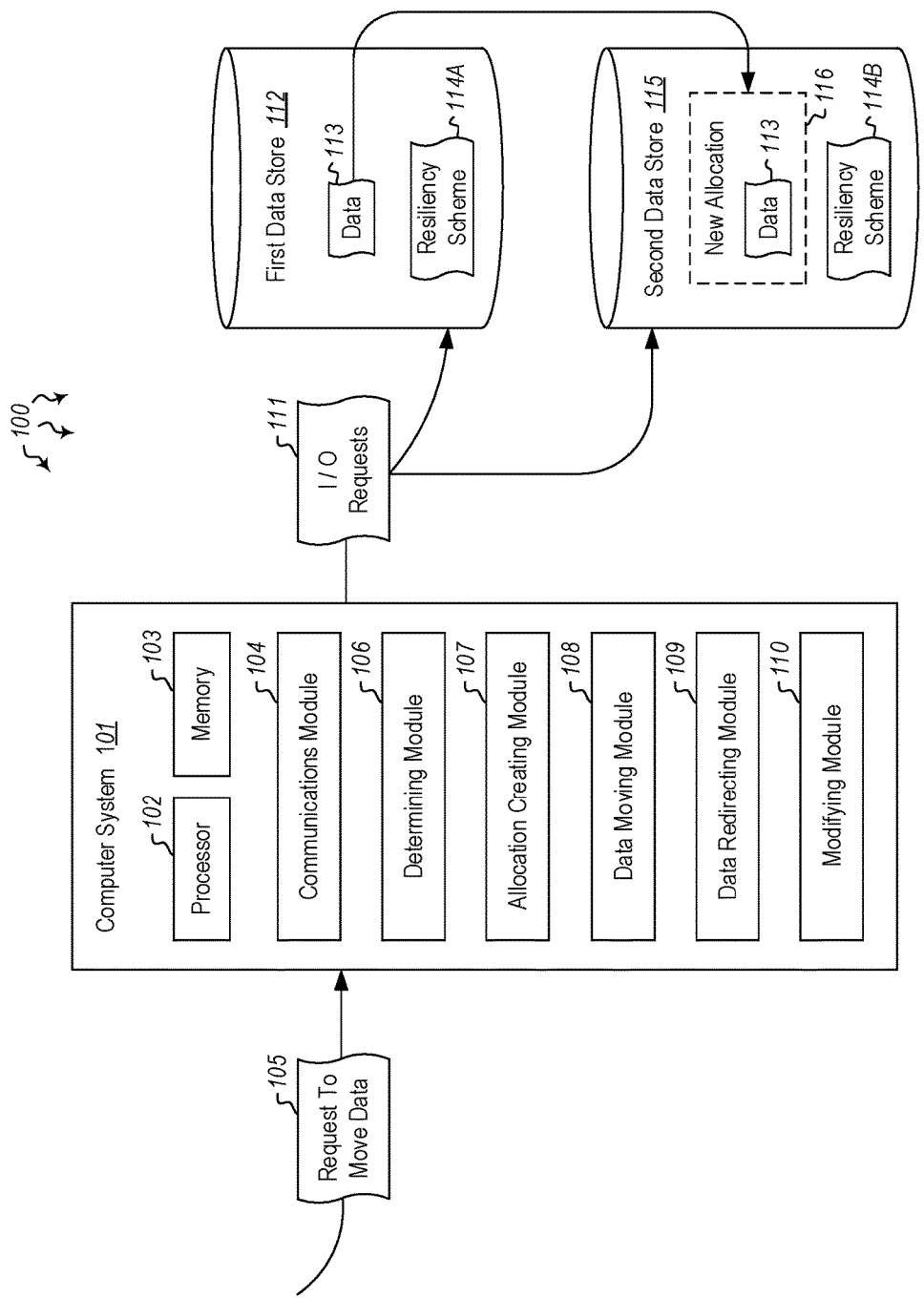
FIG. 1 illustrates a computer architecture in which embodiments described herein may operate including modifying storage capacity within a data store.

Embodiments described herein are directed to modifying storage capacity within a data store and to modifying resiliency for at least a portion of a data store. In one embodiment, a computer system receives a request to move data. The request to move data may specify a data store to move the data off of, a data store to move the data to, or may allow the computer system to select where the data is moved from and/or moved to. The computer system may determine that data is to be moved from an allocation on one data store to a new allocation on another data store. The computer system may create a new allocation on the other data store, where the new allocation is configured to receive data from the first data store. The computer system then moves the data to the new allocation on the second data store as data I/O requests are received at the first data store. Data store access requests are synchronized with the data movement by directing the data store access requests to the first data store, to the second data store or to both data stores depending on the type of access request.

In another embodiment, a computer system modifies resiliency for a data store. The computer system determines that a resiliency scheme for at least part of a data store is to be changed from one resiliency scheme to another resiliency scheme, where the data store is configured to store different portions of data. The computer system determines how the specified portion of data within the data store is to be altered according to the change in resiliency scheme, and modifies the resiliency scheme of the specified portion of the data store, such that the resiliency scheme for the specified portion of the data store is changed, while the resiliency scheme for other portions of the data store is not changed.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The communications module 104 of computer system 101 may be further configured to receive requests to move data 105. Such requests may be received from applications, from users or from other computer systems. The request to move data 105 may be generated internally to computer system 101, or may be received from a source external to computer system 101. The determining module 106 may determine, based on the received request to move data 105, that data 113 is to be moved from a first data store 112 to a second data store 115. The data stores 112 and 113 may be local to or remote to computer system 101. The data stores may be single storage devices, arrays of storage devices or storage networks such as SANs or the cloud. The data stores may store the data 113 according to resiliency schemes. These resiliency schemes may include data mirroring or parity schemes such as data striping, or any other type of resiliency scheme including the various redundant array of inexpensive disks (RAID) schemes.

In response to the determination that data 113 is to be moved from the first data store 112 to the second data store 115, the allocation creating module 107 of computer system 101 creates a new allocation 116 on the second data store 115. The data moving module 108 may then move the data 113 to the newly created allocation 116 on the second data store 115. In some embodiments, the data stores 112 and 115 may be online data stores that are exposed to the internet. In such cases, data is moved between online databases or other data stores. During this process, any data store access requests (such as a request to move data 105) may be synchronized with the data movement by directing the data store access requests to the first data store 112, to the second data store 115 or to both data stores depending on the type of access request. This process will be described in greater detail below.

As the term is used herein, "online data movement" represents the process of moving allocations containing data from one data store (e.g. a set of hard drives or tape drives) to another. This migration of data takes place without disrupting the functionality or availability of the data store, and without reducing the number of failures that can be tolerated. Additionally, as part of this process, a new set of drives may be selected to transition the data storage space to a different fault domain (e.g. upgrading from being able to tolerate a single enclosure failure, to being able to tolerate a whole rack failure). As used herein, the term "fault domain" may refer to an enclosure (e.g. just a bunch of disks or JBOD), a computer (node), a collection of nodes grouped by a common physical element (e.g. all the blade servers in an enclosure, all the nodes in a rack, or all the nodes behind a specific network switch), or a collection of nodes grouped by a logical element (e.g. an upgrade domain which includes nodes that will be brought down together for servicing). The new set of drives may also increase the storage efficiency of the storage space (i.e. better utilize the drive's capacity), or improve the performance of the storage space (e.g. spread 'hot' data (i.e. data that is accessed frequently) across more drives).

Large scale deployments frequently add and remove hardware as requirements grow and old hardware goes out of warranty. Moreover, workloads may grow and change over time, requiring storage that can adapt to these changes by allowing data to migrate away from drives that have reached their end of life, migrate onto new hardware, and shift around to better utilize the available bandwidth and capacity based on the workload. This is done in real time without compromising the integrity or resiliency of data.

In traditional scenarios, data can be shifted as drives are added or removed; however, the data is typically required to be spread across all drives in the system equally. For example, many RAID cards support increasing the drives in an array by increasing the columns of the RAID volume.

Also, previous solutions would compromise the integrity of the data in order to perform movement (e.g. treating a disk to remove data from as failed).

Embodiments described herein allow data to be moved between data stores (online or otherwise) based on various criteria including user-defined criteria. Embodiments further provide the ability to selectively move data based on external input or other criteria (such as information about the heat of data), or internal heuristics (such as moving data away from the ends of hard drives to achieve short stroking and thus faster data access times). Embodiments may further include increasing the number of copies in a mirror and converting a parity (RAID5/6) to parity with mirroring (RAID5/6+1) dynamically and sparsely (only on the sections that need to be moved), removing a disk from a RAID array by mirroring its contents across the remaining disks to avoid compromising integrity, moving data across fault domains to increase the resiliency of a RAID array to more than its initial creation (e.g. migrating an array that can lose an enclosure to one that can lose a rack), and converting a mirror space to a parity space in place (or vice-versa) without rewriting the data.

In some embodiments, data migration is performed by temporarily converting simple and mirror spaces to mirrors with more copies. For this approach to work on parity, the concept of a RAID5+1 will be described. As the term is used herein, RAID5+1 will include a standard parity layer, which has read, write, and reconstruct capabilities. Reads and writes to the underlying disks will be redirected through a mirror layer which has its own read, write, and reconstruct capabilities. To avoid unnecessary complexity in the parity layer, the mirroring laying will provide an aggregated view of all the copies holding each individual column.

When a data migration is to be performed, a task may be used to create another allocation as the destination and temporarily increase the data store's number of copies. This allocation will begin life as stale (i.e. it needs to be reconstructed because it does not contain valid data), and will be picked up and transitioned to healthy by a reconstruction task. In this manner, data migration is performed at the granularity of allocation within a data store (instead of performing it on every allocation in the data store). Such embodiments offer advantages including, but not limited to, the following: 1) When migrating multiple copies of the same column, only one of the copies needs to be read and can be written to both of the destinations. 2) If a read fails during migration, but other copies of data 113 are available, they will be available to reconstruct from. 3) The ability to read from any copy of data to perform the movement will also increase the ability to parallelize migrations, especially when moving mirrors off of a disk.

In another embodiment, data is migrated between data stores by migrating entire slabs (i.e. collections of allocations that form a resiliency level). This process allocates a whole slab, or set of slabs, at the same offset of a current group of slabs. These new allocations may be marked as a destination in an object pool configuration. By allowing sets of slabs to be migrated, the slab size can change, as well as any other resiliency properties. If the source and destination configurations have different slab sizes, then the migration will be performed on the smallest size which may be divided by both slab sizes (i.e. the least common multiple).

Following the reallocation, a mirror object may be placed above the slabs, forwarding writes to both copies while a task (e.g. a reconstruction task) copies data from the old slab(s) to the new destination slab(s). When this task completes, the old slabs will be discarded and the new slabs will come in as a separate storage tier (to represent any changes in resiliency). If the resiliency type of the destination implements a write-back cache, then a second child space may be allocated to replace the old one. This allows migration between any two resiliency configurations (resiliency type, slab size and fault tolerance can all change).

In another embodiment, whole slabs are migrated with data overlap. This is a variant to the embodiment described above, and would migrate at the slab level, but would not allow the size of a slab to change. To stop the excessive movement of data, only columns which are moving would be reallocated, the remaining columns would be "ghosted" or "no-oped" on the second (destination) slab. The columns would appear to be there, but writes to them would be blocked. This moves a minimal amount of data and allows upgrades including enabling resiliency changes.

In yet another embodiment, individual columns may be migrated with RAID level migration. This process may be implemented by two separate mechanisms which work together to provide an end-to-end solution. The first process reallocates individual columns in place. First, a task (such as a pool transaction) creates new allocations and pairs them with sources that are to be moved. Each source and destination are then combined into a mirror, with the destination being marked as 'Needs Regeneration' or an equivalent marking. These mirrors are then surfaced to the slab as a single allocation, and the regeneration task copies the data from the source to destination. Upon completion, a task deletes the old allocations and the mirror objects under the slab are replaced by the new allocations. The second mechanism allows conversion between mirror and parity storage spaces. First, the mirroring is separated from the striping by making a storage space with a mirror in place of each allocation. The parity columns are then tacked onto the end and marked as needing regeneration. When this regeneration completes, a second pool transaction selects one copy from each of the mirrors and surfaces a parity slab.

The conversion from mirror to parity results in an enclosure- or rack-aware parity space, the enclosure-aware parity spaces having the correct on-disk format. This process can also be reversed to convert back to a mirror and a similar process can convert between storage spaces such as 2-way mirrors and 3-way mirrors. During this conversion, some data columns may need to be moved to guarantee the ability to tolerate higher fault domain failure(s) (as mirror has different allocation requirements than parity). This migration may be performed as an intermediate step (after parity has been regenerated) to avoid placing the data store in a state of reduced resiliency. This allows fine grain control of which allocations move. Moreover, free space is only required on destination drives, and multiple slabs may be migrated in parallel. These concepts will be explained further below with regard to methods 200 and 300 of FIGS. 2 and 3, respectively.

Figure 2:
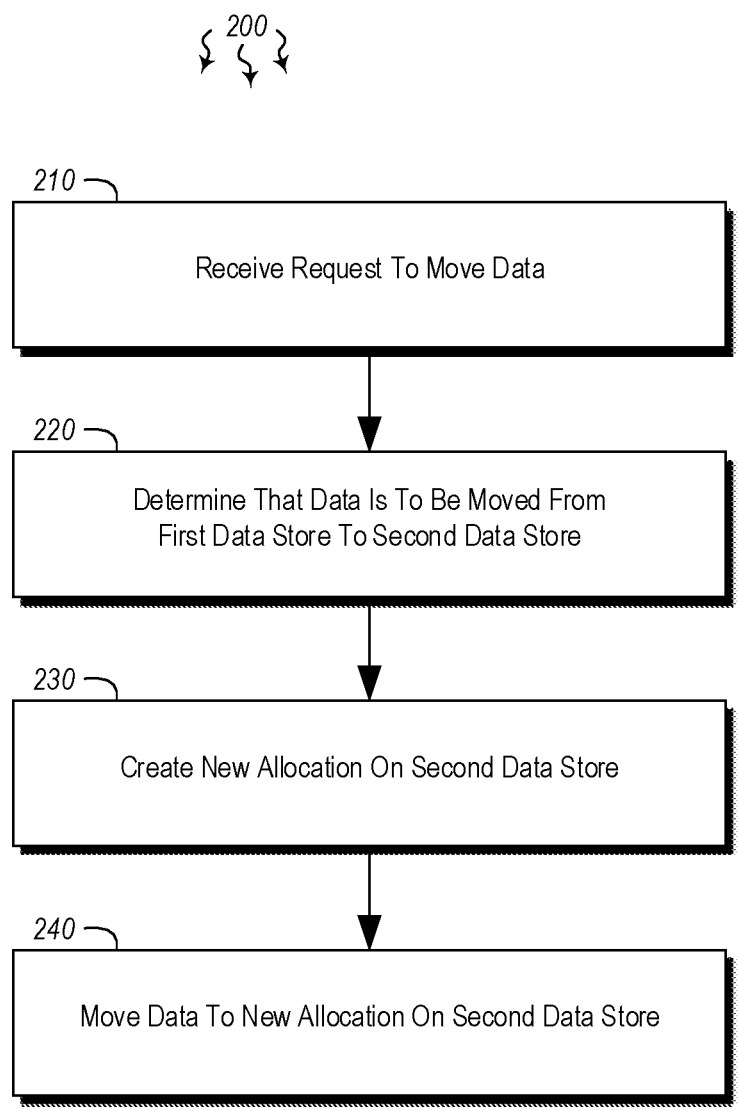
FIG. 2 illustrates a flowchart of an example method for modifying storage capacity within a data store.
Figure 3:
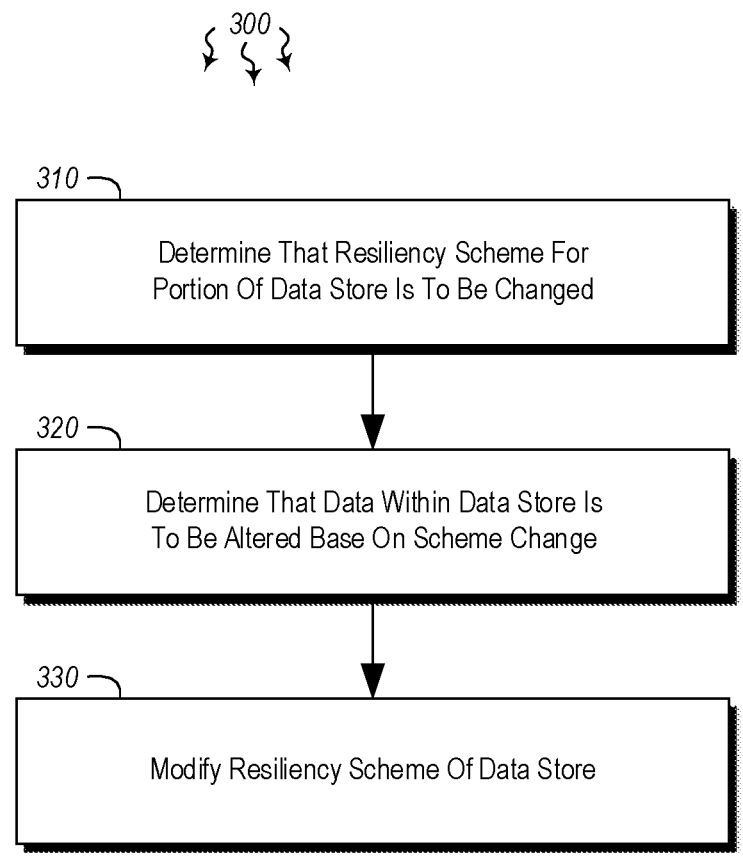
FIG. 3 illustrates a flowchart of an example method for modifying resiliency for at least a portion of a data store.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for modifying storage capacity within a data store. The method 200 will now be described with frequent reference to the components and data of environment 100.

Method 200 includes receiving a request to move one or more portions of data (210). For example, communications module 104 of computer system 101 may receive a request to move data 105 from a request source. The request source may be an application, service, user or other computer system. The request may specify that data 113 is to be moved from one data store 112 to another data store 115, either or both of which may be online. The data 113 may be individual files, collections of files, blobs of data or other allocations of data such as slabs, metadata or other types of data or collections of data. The request 105 may specify the data store to move data off of (e.g. first data store 112 in FIG. 1), the data store to move data to (e.g. second data store 115 in FIG. 1), or neither (i.e. the request may simply indicate that a certain portion of data is to be moved). If no data store is specified, the computer system 101 may determine which data stores have the specified data and may further determine which data store(s) the data is to be moved to. In such cases, the request 105 may include information about the data stores to aid the system in making the decision. The request may include multiple data sources and multiple data targets.

Method 200 further includes determining that data is to be moved from the first data store to the second data store (220). The determining module 106 of computer system 101 may determine, based on the request to move data 105, that data 113 is to be moved from the first data store 112 to the second data store 115. This determination may include determining which data or data stores are being most heavily utilized. As mentioned above, each data store may include a single storage device or multiple storage devices. In cases where a data store is an array of hard drives, some of the hard drives may be being used more than others. Those drives that are constantly being written to may be said to be "hot" or including "hot data", whereas drives that are not being written to as often are "cold" or include a greater portion of "cold data." The determining module 106 may identify which data (among data 113) can be moved, which data must move and where the data is to be moved to. In some cases, data cannot be moved and may be labeled "unmovable data." If the data can move, the determining module 106 may determine the best location for that data.

These determinations may be made based on various factors including external component input. For example, a heat engine may be implemented which tracks all reads/writes to data in a given data store. Other factors may include heuristics (e.g. move data away from ends of drives to facilitate short trips for the hard drive data reading tip). Still other factors may include characteristics of the data store including favoring larger drives over smaller drives, favoring the outside of the drive platter as it is traveling faster and is capable of quicker reads and writes. The determining module 106 may further be configured to identify where data I/O request bottlenecks are occurring. For example, if multiple applications are trying to write data to a single hard drive or a set of hard drives within the first data store, and the high volume of data writes to those drives is causing an I/O bottleneck, the determining module may determine that existing data on those drives is to be moved to other drives to spread out the I/O requests 111, or that the incoming I/O requests are to be redirected to other drives within the data store (e.g. by the data redirecting module 109) or to a different data store (e.g. the second data store 115).

Method 200 further includes creating a new allocation on the second data store, the new allocation being configured to receive at least a portion of data from the first data store (230), and moving the data to the new allocation on the second data store as data I/O requests are received at the first data store, wherein data store access requests are synchronized with data movement by directing the data store access requests to the first data store, the second data store or both data stores depending on the type of access request (240). The allocation creating module 107 of computer system 101 may create new allocation 116 on the second data store 115. This new allocation 116 may be configured to receive some or all of the data 113 that is moved from the first data store 112 to the second data store 115.

In some embodiments, the second data store 115 may include at least one hard drive. In such cases, the newly created allocation 116 on the second data store 115 may be located substantially near the beginning of the hard drive (i.e. near the outer edge of the hard drive). In this manner, data may be moved away from the ends of hard drives on the first data store and moved to the beginning of drives on the second data store 115. This allows the data to be accessed more quickly. Other optimizations may be used for other data storage devices such as tape drives or optical drives.

The second data store 115 may be configured to accept new data storage devices and/or new data storage media. In some embodiments, the second data store 115 may include data storage media that was added to the second data store. This second data store may be located on a fault domain that is different from the fault domain of the first data store. For instance, if a fault domain is established for a given hardware storage rack (e.g. first data store 112), the storage media may be added to the second data store 115 which, at least in some embodiments, is in a different fault domain than the first data store. When new media is added, the existing data may be rebalanced, based on what kind of hardware was added. Indeed, in some cases, entire racks may be added to existing data stores. In such cases, the existing data may be rebalanced among the hardware storage devices of the newly added rack.

When the rebalancing occurs, the data is not necessarily distributed evenly among the different drives. For instance, when hard drives are added to a data store, some of those hard drives may be different capacity drives. In such cases, the full capacity of each hard disk may be assigned to and be accessible by the second data store. Accordingly, each hard drive or tape drive or other type of block storage such as solid-state drives (SSDs), non-volatile memory express (NVMe), virtual hard disks (VHDs), etc. may be used to its fullest extent, even when other drives of larger or smaller capacity are present. When data writes are received at the data store, the data writes may be sent to both the first and second data stores, and incoming data reads may be sent to the first data store until the data of the first data store is copied to the new allocation on the second data store. In this manner, consistency is maintained at the data stores, such that incoming writes can be sent to either data store, while data reads are sent to the older data until the data is fully copied over to the other (second) data store.

Figure 5:
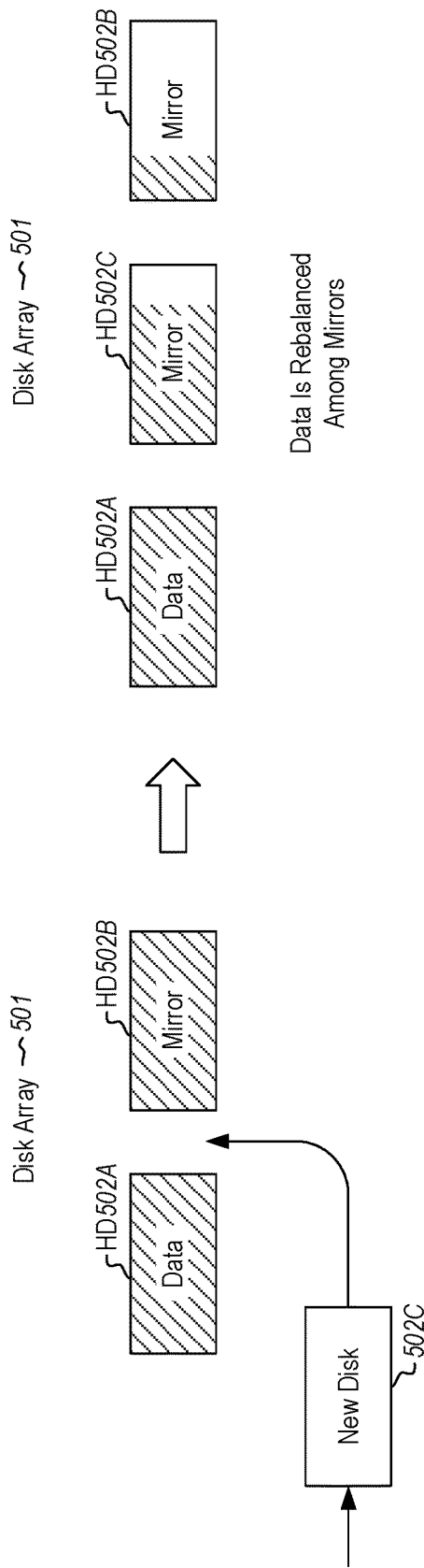
FIG. 5 illustrates an embodiment in which storage capacity is added and data is rebalanced among remaining data storage.

In FIG. 5, a disk array 501 is shown having two hard drives: HD 502A and HD 502B. A new hard drive 502C may be added to the disk array 501 during operations. When the new disk 502C is added, the data of the disk array is rebalanced using the new disk and any existing disks. The rebalancing may be performed without compromising any existing resiliency implementations on the disk array. For instance, if data mirroring has been implemented, the data in HD 502A may be mirrored between previous disk 502B and newly added disk 502C. The data may be distributed evenly among the disks of the array, or may be distributed in another manner, such as based on the heat of the data or the overall heat of the disk. Here, it should be noted that while two or three disks are shown in FIG. 5, the disk array 501, or either of the data stores in FIGS. 1 (112 & 115), may include substantially any number of disks, tape drives or other storage devices. Moreover, while a mirroring resiliency scheme is implemented in FIGS. 5 and 6, it should be noted that any RAID or other type of mirroring or parity resiliency scheme may be used.

Figure 6:
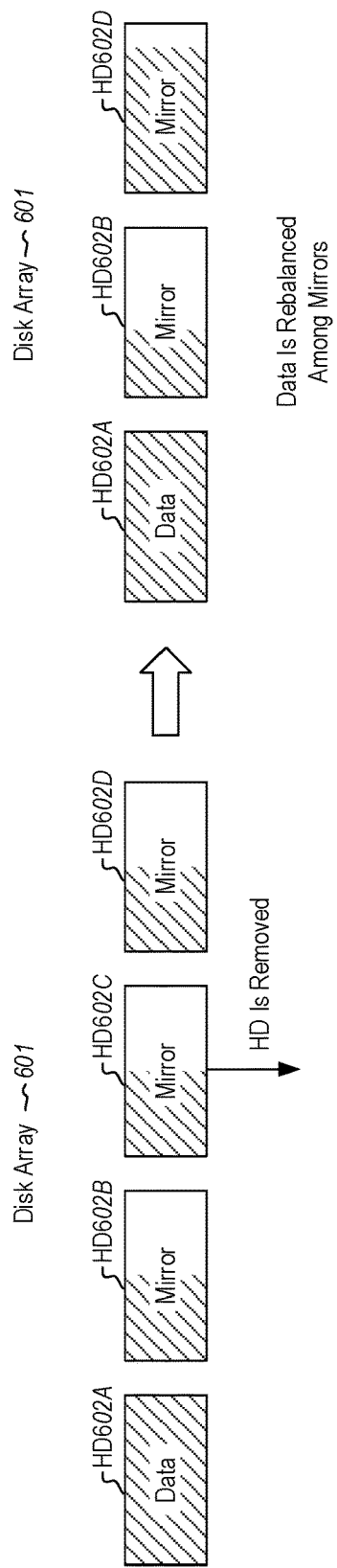
FIG. 6 illustrates an embodiment in which storage capacity is removed and data is rebalanced among remaining data storage.

FIG. 6 illustrates an embodiment where at least one hard disk is removed from a disk array 601. The disk array 601 may include hard drives HD602A, HD602B, HD602C and HD602D. Hard drive HD602C may be removed due to failure of the drive or for some other reason. The disk array 601 now includes HD602A, HD602B and HD602D. The data that was on drive HD602C is rebalanced among the remaining hard drives. As with the embodiment above where a hard drive was added to the disk array, the data may be rebalanced according to a variety of different factors, and does not need to be rebalanced evenly over the remaining hard drives. Furthermore, as with the above example, disks may be removed from the array 601 without compromising existing resiliency implementations such as mirroring. The data may be automatically and dynamically distributed among the remaining drives in a manner that does not degrading the resiliency of the disk array 601. The data may be rebalanced according to hot or cold data, such that the hot and cold data are distributed evenly among the remaining drives, or may be rebalanced to the beginning of each disk. Additionally or alternatively, data may be rebalanced according to the assigned importance of the data (i.e. the importance of the data may dictate the order in which the data is rebalanced).

Returning to FIG. 1, in some embodiments, data I/O collisions may be prevented during transition of the data 113 to the new allocation 116 by allowing a first user's data writes to take priority over a second user's data writes or by allowing a user's data writes to take priority over a computing system's data writes, or vice versa. As such, when writes are coming in from multiple different users or applications, the writes may be prioritized based on user or applications and processed in order of priority, such that I/O collisions are avoided. When data has been successfully moved to a new data store (or to a new allocation), any previously used allocations on the first data store may be deleted.

The allocations (whether existing or newly added) are implemented within the data store to logically define specified areas of storage. Each allocation identifies where the allocation is located within the data store, what data it contains and where its data is stored on different data storage devices. The allocations may be stored in a mapping table. Whenever storage devices are added to a data store (such as disk array 501/601 above) or removed from a data store, the computing system 101 may access the mapping table to determine which allocations were stored on the added/removed storage devices. Then, the data stored on the added/removed drives is rebalanced to one or more other storage devices of the data store. In some cases, previously used allocations may include a pointer to the newly created allocation on the data store to which the data is being moved (i.e. the second data store 115), In this manner, if data is deleted during transition of the data from the first data store to the second data store, the newly created allocation is notified of the deletion, and resiliency is guaranteed throughout the transition.

Turning now to FIG. 3, a flowchart is illustrated of a method 300 for modifying resiliency for at least a portion of a data store. The method 300 will now be described with frequent reference to the components and data of environment 100.

Method 300 includes determining that a resiliency scheme for at least a specified portion of a data store is to be changed from a first resiliency scheme to a second, different resiliency scheme, the data store including one or more portions of data (310). For example, the determining module 106 of computer system 101 may determine that resiliency scheme 114A for at least some data 113 on the first data store 112 is to be changed to a second resiliency scheme 114B. As mentioned above, the resiliency schemes may include mirroring, parity or combinations thereof (including the various RAID implementations) or other resiliency schemes.

Method 300 next includes determining how the data within the specified portion of the data store is to be altered according to the change in resiliency scheme (act 320) and modifying the resiliency scheme of the specified portion of the data store, such that the resiliency scheme for the specified portion of the data store is changed, while the resiliency scheme for other portions of the data store is not changed (330). The determining module 106 of computer system 101 may thus determine how the data 113 is to be altered according to the change in resiliency scheme (e.g. from mirroring to parity or from parity to mirror). The modifying module 110 of computer system 101 may then modify the resiliency scheme for a certain portion of data, while leaving other portions of data untouched.

Figure 4:
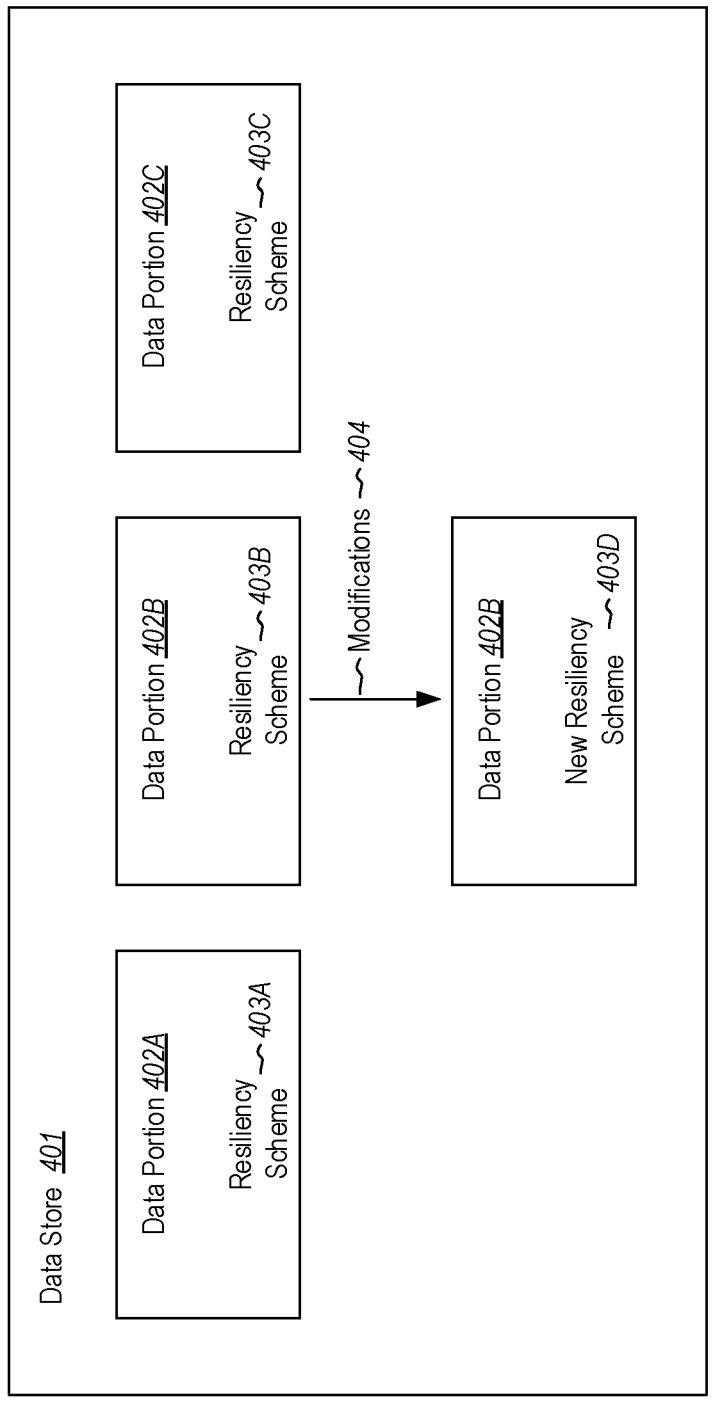
FIG. 4 illustrates an embodiment in which a resiliency scheme is modified for at least a portion of data.

Thus, for example, as shown in FIG. 4, data store 401 has multiple different data portions (402A, 402B and 402C). These data portions may each be different storage devices (e.g. hard disks) or may be logical portions of the same hard disk, or a combination of physical and logical data portions. Each data portion within the data store may have its own resiliency scheme: scheme 403A for data portion 402A, scheme 403B for data portion 402B, and scheme 403C for data portion 402C. Embodiments herein may modify a portion of a data store (e.g. 402B) and its resiliency scheme without modifying other portions of the data store or their resiliency schemes. Thus, when modifications 404 are made to the data store portion 402B, a new resiliency scheme 403D may be implemented for that data portion without affecting any other data portions.

In some cases, a storage device may be added to a data store. At least one portion of that storage device may be implementing an N-way mirror resiliency scheme. When the new device is added, an N+1-way mirroring scheme may be implemented for the data store, such that the data store data is split between two storage devices. The split need not be even, and may be balanced according to heuristics such as relative heat level. Still further, in some case, a storage device may be removed from a data store. The data that was stored on the removed data storage device may be rebalanced among the remaining storage devices, without rebalancing existing data on the remaining storage devices. The granularity of the data store portions that are to be converted from one resiliency scheme to another may be set to an arbitrary value (1 GB) or may be substantially any size. In this manner, whole volumes or arrays need not be converted to change a resiliency scheme. Rather, embodiments herein may convert one section of an array or volume from mirroring to parity or vice versa, while leaving the rest of the volume or array alone. Then if user wants to remove one drive, the system can merely rebalance/realign the data on that drive or that portion of the data store.

Accordingly, methods, systems and computer program products are provided which modify storage capacity within a data store. Moreover, methods, systems and computer program products are provided which modify resiliency for at least a portion of a data store.

Claim Support

A computer system is provided including at least one processor. At the computer system, a computer-implemented method is provided for modifying storage capacity within a data store. The method includes receiving a request 105 to move one or more portions of data, determining that data 113 is to be moved from an allocation on a first data store 112 to a new allocation 116 on the second data store 115, the first and second data stores being configured to store allocations of data, creating the new allocation 116 on the second data store 115, the new allocation being configured to receive at least a portion of data 113 from the first data store 112, and moving the data 113 to the new allocation 116 on the second data store 115 as data I/O requests 111 are received at the first data store, wherein data store access requests are synchronized with the data movement by directing the data store access requests to the first data store 112, to the second data store 115 or to both data stores depending on the type of access request.

In some embodiments, determining that data is to be moved from the first data store to the second data store comprises determining which data or data stores are being most heavily utilized. In some embodiments, the second data store comprises at least one hard drive, and wherein the new allocation on the second data store is located nearer to the beginning of the second data store than the allocation on the first data store. In some embodiments, the second data store comprises a data storage media that was added to the computing system, the second data store being located on a fault domain that is different from the fault domain of the first data store. In some embodiments, the fault domain comprises a hardware storage rack, such that the second data store comprises data storage media that was added to hardware storage rack that is different from the hardware storage rack of the first data store.

A computer system is provided including at least one processor. At the computer system, a computer-implemented method is provided for modifying resiliency for at least a portion of a data store. The method includes determining that a resiliency scheme 114A for at least a specified portion of a data store 112 is to be changed from a first resiliency scheme 114A to a second, different resiliency scheme 114B, the data store including one or more portions of data 113, determining how the data 113 within the specified portion of the data store 112 is to be altered according to the change in resiliency scheme, and modifying the resiliency scheme 114A of the specified portion of the data store 112, such that the resiliency scheme for the specified portion of the data store is changed, while the resiliency scheme for other portions of the data store is not changed.

Some embodiments further include adding a storage device to the data store, wherein the specified portion of the data store is implementing an N-way mirror resiliency scheme and implementing an N+1-way mirroring scheme for the data store, wherein the data store data is split between two storage devices. Other embodiments further include removing a storage device from the data store and rebalancing the data that was stored on the removed data storage device among the remaining storage devices, without rebalancing existing data on the remaining storage devices.

A computer system comprising the following: one or more processors, a receiver 104 for receiving a request 105 to move one or more portions of data off of a first data store 112 and on to a second data store 115, a determining module 106 for identifying which data 113 is to be moved from the first data store to the second data store, an allocation creating module 107 for creating a new allocation 116 on the second data store 115, the new allocation being configured to receive at least a portion of data 113 from the first data store 112 and a data moving module 108 for moving the data 113 to the new allocation 116 on the second data store 115 as data I/O requests 111 are received at the first data store, such that data writes are sent to both the first and second data stores, and data reads are sent to the first data store 112 until the data 113 of the first data store is copied to the new allocation 116 on the second data store 115.

Some embodiments further include removing at least one storage device from the data store, accessing the mapping table to determine which allocations were stored on the removed storage devices and rebalancing the data of the allocations stored on the removed drive to one or more other storage devices of the data store. In some embodiments, the second data store comprises a plurality of block storage devices, at least two of which are of different capacity. Some embodiments further include adding at least one hard disk to the plurality of block storage devices in the second data store and rebalancing at least a portion of data stored on the first data store among the newly added hard drive and at least one of the existing plurality of hard disks, the rebalancing being performed without compromising existing resiliency implementations on the second data store.

Some embodiments further include removing at least one hard disk from the plurality of hard disks in the first data store and rebalancing at least a portion of data stored on the first data store among the remaining hard disks of the plurality of hard disks, the rebalancing being performed without compromising existing resiliency implementations on the second data store. In some embodiments, data I/O collisions are prevented during transition of the data to the new allocation by allowing a user's data writes take priority over the computing system's data writes. In some embodiments, the previously used allocation includes a pointer to the newly created allocation on the second data store, such that if data is deleted during transition of the data from the first data store to the second data store, the newly created allocation is notified of the deletion.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for online data movement in which allocations containing data at a first data store are moved to a second data store based on criteria other than simply adding or removing disks, the computer-implemented method being performed by one or more processors executing computer-executable instructions, and comprising:

receiving a request to move one or more allocations containing data at a first data store;
based on criteria other than adding or removing disks, determining that the one or more allocations containing the data at the first data store are to be moved from the first data store to a second data store, wherein said criteria other than adding or removing disks comprises one or more of:
  external input regarding frequency of access of the data that is to be moved;
  internal heuristics related to hardware access times for the data that is to be moved; or
  a determination that a resiliency scheme is to be changed wherein said determination that a resiliency scheme is to be changed further comprises:
    determining how the data contained in the one or more new allocations is to be altered according to the change in resiliency scheme; and
    changing a first resiliency scheme to a second resiliency scheme for the one or more new allocations at the second data store, but doing so without affecting the resiliency scheme for other data stored at the second data store that is not contained in the one or more new allocations;
creating one or more new allocations at the second data store, wherein the one or more new allocations receive data based on the one or more allocations containing the data that are to be moved from the first data store;
moving the one or more allocations containing the data from the first data store to the one or more new allocations at the second data store as data I/O requests are received at the first data store; and
as the one or more allocations are moved from the first data store to the second store, synchronizing the data I/O requests at the first and second data stores by performing the following:
  sending data write requests to both the first and the second data stores; and
  sending data read requests only to the first data store until such time as the data contained in the one or more allocations that are to be moved has been fully copied to the one or more new allocations at the second data store.

2. The computer-implemented method of claim 1, wherein the criteria used in determining that the one or more allocations containing data is to be moved from the first data store to the second data store further comprises one or both of which data or data stores are being most heavily utilized.

3. The computer-implemented method of claim 1, wherein the criteria used in determining that the one or more allocations containing data is to be moved from the first data store to the second data store further comprises determining which data among the one or more allocations containing the data is moveable.

4. The computer-implemented method of claim 1, wherein the second data store comprises at least one hard drive, and wherein the new allocation on the second data store is located nearer to a beginning of the at least one hard drive of the second data store as compared to the allocation on the first data store.

5. The computer-implemented method of claim 1, wherein the second data store is located on a fault domain that is different from the fault domain of the first data store.

6. The computer-implemented method of claim 5, wherein each fault domain comprises a hardware storage rack, and wherein the second data store comprises data storage media added to a hardware storage rack that is different from the hardware storage rack of the first data store.

7. The computer-implemented method of claim 1, wherein the second data store comprises a plurality of block storage devices, at least two of which are of different capacity.

8. The computer-implemented method of claim 7, further comprising:
  adding at least one hard disk to the plurality of block storage devices in the second data store; and
  rebalancing data contained in the one or more allocations at the first data store among the newly added hard drive and at least one of the existing plurality of hard disks, and wherein the rebalancing is performed without compromising existing resiliency implementations on the second data store.

9. The computer-implemented method of claim 7, further comprising:
  removing at least one hard disk from the plurality of hard disks in the first data store; and
  rebalancing data contained in the one or more allocation at the first data store among the remaining hard disks of the plurality of hard disks, and wherein the rebalancing is performed without compromising existing resiliency implementations on the second data store.

10. The computer-implemented method of claim 1, wherein data I/O collisions are prevented while moving the allocations containing data at the first data store to the one or more new allocations by allowing a user's data writes to take priority relative to other computing system data writes.

11. The computer-implemented method of claim 1, further comprising deleting one or more previously used allocations on the first data store upon determining that the data contained in the one or more deleted allocations has been moved to the second data store.

12. The computer-implemented method of claim 11, wherein the one or more previously used allocations include a pointer to one or more newly created allocations on the second data store, such that if data is deleted when moving the data contained in the one or more allocations from the first data store to the new created one or more allocations at the second data store, the newly created one or more allocations are notified of the deletion.

13. The computer-implemented method of claim 1, wherein the second resiliency scheme comprises changing the first resiliency scheme from mirror to parity or from parity to mirror.

14. The computer-implemented method of claim 1, further comprising:
  adding a storage device to the second data store; and
  wherein the first resiliency scheme comprises an N-way mirror resiliency scheme, and the first resiliency scheme is changed to the second resiliency scheme which comprises an N+1-way mirroring scheme in which data in the one or more new allocations is split among the added storage device and one or more other storage devices already at the second data store.

15. The computer-implemented method of claim 1, further comprising:
  removing a storage device from the second data store; and
  rebalancing data that was stored on the removed data storage device among the remaining storage devices at the second data store, but doing so without rebalancing data other than the data that was stored on the removed data storage device.

16. A computer system comprising:
one or more computer-readable hardware storage devices having stored thereon computer-executable instructions;
one or more processors which, when executing the computer-executable instructions, configure the computer system with an architecture that performs online data movement in which allocations containing data at a first data store are moved to a second data store based on criteria other than simply adding or removing disks, and wherein architecture performs the online data movement using a computer-implemented method that comprises:
receiving a request to move one or more allocations containing data at a first data store;
based on criteria other than adding or removing disks, determining that the one or more allocations containing the data at the first data store are to be moved from the first data store to a second data store, wherein said criteria other than adding or removing disks comprises one or more of:
external input regarding frequency of access of the data that is to be moved;
internal heuristics related to hardware access times for the data that is to be moved; or
a determination that a resiliency scheme is to be changed wherein said determination that a resiliency scheme is to be changed further comprises:
determining how the data contained in the one or more new allocations is to be altered according to the change in resiliency scheme; and
changing a first resiliency scheme to a second resiliency scheme for the one or more new allocations at the second data store, but doing so without affecting the resiliency scheme for other data stored at the second data store that is not contained in the one or more new allocations;
creating one or more new allocations at the second data store, wherein the one or more new allocation receive data based on the one or more allocations containing the data that are to be moved from the first data store;
moving the one or more allocations containing the data from the first data store to the one or more new allocations at the second data store as data I/O requests are received at the first data store; and
as the one or more allocations are moved from the first data store to the second store, synchronizing the data I/O requests at the first and second data stores by performing the following:
sending data write requests to both the first and second data stores; and
sending data read requests only to the first data store until such time as the data contained in the one or more allocations that are to be moved has been fully copied to the one or more new allocations at the second data store.

17. The computer system of claim 16, wherein allocations logically define specified areas of storage, each allocation identifying where the allocation is located within a data store, and where data of the allocation is stored on one or more different data storage devices of the data store, and wherein the allocations are stored in a mapping table.

18. The computer system of claim 17, wherein:
at least one storage device is removed from at least one data store;
the mapping table is accessed to determine which allocations were stored on the removed storage device; and
the data of the allocations stored on the removed storage device are rebalanced when moved to one or more other storage devices of the at least one data store.

19. A computer storage device containing executable instructions which, when executed by one or more processors, cause the one or more processors to perform a method for online data movement in which allocations containing data at a first data store are moved to a second data store based on criteria other than simply adding or removing disks, wherein the computer-implemented method comprises:
receiving a request to move one or more allocations containing data at a first data store;
based on criteria other than adding or removing disks, determining that the one or more allocations containing the data at the first data store are to be moved from the first data store to a second data store, wherein said criteria other than adding or removing disks comprises one or more of:
external input regarding frequency of access of the data that is to be moved;
internal heuristics related to hardware access times for the data that is to be moved; or
a determination that a resiliency scheme is to be changed wherein said determination that a resiliency scheme is to be changed further comprises:
determining how the data contained in the one or more new allocations is to be altered according to the change in resiliency scheme; and
changing a first resiliency scheme to a second resiliency scheme for the one or more new allocations at the second data store, but doing so without affecting the resiliency scheme for other data stored at the second data store that is not contained in the one or more new allocations;
creating one or more new allocations at the second data store, wherein the one or more new allocations receive data based on the one or more allocations containing the data that are to be moved from the first data store;
moving the one or more allocations containing the data from the first data store to the one or more new allocations at the second data store as data I/O requests are received at the first data store; and
as the one or more allocations are moved from the first data store to the second store, synchronizing the data I/O requests at the first and second data stores by performing the following:
sending data write requests to both the first and the second data stores; and
sending data read requests only to the first data store until such time as the data contained in the one or more allocations that are to be moved has been fully copied to the one or more new allocations at the second data store.

20. The computer storage device of claim 19, wherein moving the one or more allocations containing the data from the first data store to the one or more new allocations at the second data store comprises migrating entire slabs of data, wherein each slab represents a collection of allocations that form a resiliency level.

21. The computer storage device of claim 19, wherein, if the first and second data stores have configurations having different slab sizes, then the migration is performed on the smallest size which may be divided by slab sizes at both the first and second data store configurations.

* * * * *